United States Patent [19]
Franck et al.

[11] Patent Number: 5,648,976
[45] Date of Patent: Jul. 15, 1997

[54] LASER WITH VARIABLE PULSE LENGTH

[75] Inventors: Jerome Franck, Washington, D.C.;
Wolfgang Riede, Muehlacker, Germany

[73] Assignee: The United States of America as represented by the Secretary of the Air Force, Washington, D.C.

[21] Appl. No.: 390,596

[22] Filed: Feb. 17, 1995

[30]   Foreign Application Priority Data

Apr. 27, 1994 [DE] Germany ................. 44 14 585.3

[51] Int. Cl.⁶ ............................................. H01S 3/10
[52] U.S. Cl. ............................. 372/25; 372/108
[58] Field of Search ......................... 372/25, 92, 108;
359/334, 338, 347, 348

[56]   References Cited
U.S. PATENT DOCUMENTS

| 4,483,005 | 11/1984 | Smart | 372/25 |
|---|---|---|---|
| 4,943,782 | 7/1990 | Stephens et al. | 359/338 |
| 4,972,156 | 11/1990 | Gregor et al. | 372/25 |
| 5,126,876 | 6/1992 | O'Meara | 359/338 |
| 5,239,408 | 8/1993 | Hackel et al. | 359/338 |

*Primary Examiner*—Rodney B. Bovernick
*Assistant Examiner*—Robert E. Wise
*Attorney, Agent, or Firm*—Thomas C. Stover

[57]   ABSTRACT

A device for generating short laser pulses comprises a laser oscillator for generating a first laser pulse, a pulse compression element which retroreflects the first laser pulse by stimulated Brillouin scattering (SBS) as a temporally shortened pulse, a reflection element into which the temporally shortened laser pulse is retroreflected for further temporal shortening of the pulse, and an outcoupling element disposed between the pulse compression element and the reflection element for outcoupling the so shortened laser pulse.

29 Claims, 4 Drawing Sheets

FIG. 1
PRIOR ART
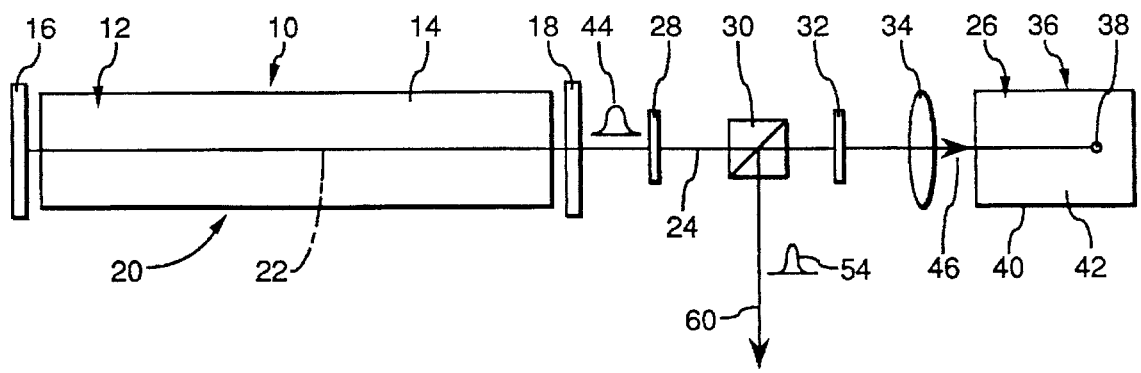
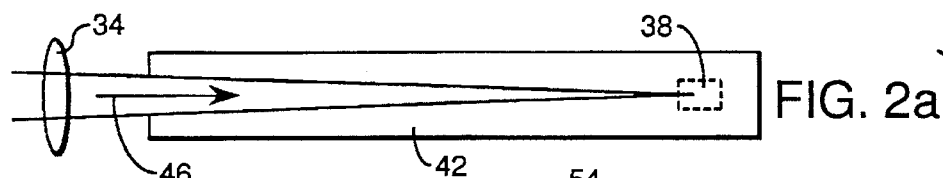
FIG. 2a
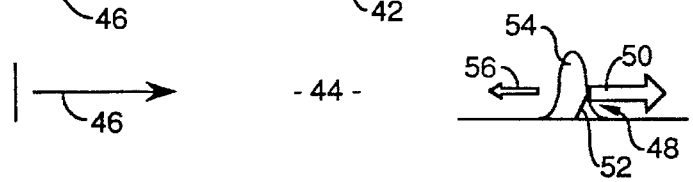
FIG. 2b
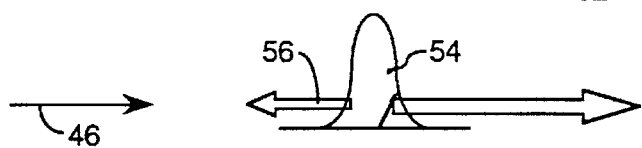
FIG. 2c
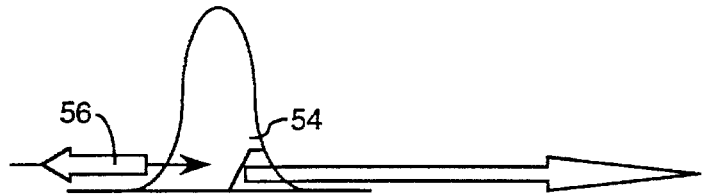
FIG. 2d
PRIOR ART

LASER WITH VARIABLE PULSE LENGTH

STATEMENT OF GOVERNMENT INTEREST

The invention described herein may be manufactured and used by or for the Government for governmental purposes without the payment of any royalty thereon.

FIELD OF THE INVENTION

This invention relates to laser pulses particularly compressing laser pulses.

BACKGROUND OF THE INVENTION

Presently available are devices which generate short laser pulses including a laser oscillator which generates a first laser pulse, an element to compress the pulse by reflecting the first laser pulse by stimulated Brillouin scattering into a laser pulse of a shorter temporal duration, and a primary ray path that includes the laser oscillator and the pulse compressing element and along which the first laser pulse travels from the laser oscillator to the pulse compressing element.

Such devices, known from prior art, normally make use of laser oscillators generating the first laser pulse with the temporal duration in the range of nanoseconds, most preferably in the range between approximately a few and and some tens of nanoseconds. Laser pulses generated in that way are shortened by one reflection cycle inside a pulse compressing element.

The shortcomings of these devices are that the temporal duration of the shortened or compressed pulse depends on the refractive medium inside the pulse compressing element and—in particular—the fact that there is no possibility to generate laser pulses of a predefined time duration.

Therefore, this invention has the underlying task to create a device and a process that opens up the possibility of generating laser pulses with a predefined time duration.

SUMMARY OF THE INVENTION

This task is resolved here by the kind of invention described above by incorporating a reflective branch into the device, into which the pulse, being shortened in time duration and being reflected back, enters after leaving the pulse compressing element. The reflective branch uses an additional reflective element to reroute the laser pulse of shortened time duration back into the pulse compressing element for further shortening of the temporal duration. The reflecting ray path between the reflecting and the pulse compressing elements includes a outcoupling element to release the laser pulse out of the reflecting ray path.

ADVANTAGES OF THE INVENTION

The advantage of the solution according to the principles of the invention is that it opens up a simple way to use the same pulse compressing element for various numbers of times to achieve a multiple shortening of the temporal duration of a laser pulse and to achieve a possibility of variable predefinition of the temporal duration of a laser pulse by predefining how many times the pulse will travel trough the reflecting ray path. The outcoupling element is used to release the laser pulse after the predefined number of round trips through the reflecting ray path, the laser pulse thus having a predefined time duration.

There is a special advantage, if the outcoupling element is controlled by a steering device in a way that after a predefined number of reflections inside the pulse compressing element the laser pulse is released out of the reflecting ray path.

For reasons of practicality, the steering device includes a detector that registers the occurrence of a reflected laser pulse.

In the most simple case the steering device includes a detector that registers the reflection of a laser pulse inside the pulse compressing element.

Alternatively, it can be advantageous to include the detector into the reflecting ray path in such a way that the detector registers pulses traveling through the reflecting ray path.

Another possibility is to register by means of a detector a laser pulse being reflected back by the reflective element included into the reflective branch into the pulse compressing element.

A tiltable mirror, for example, can be used as a outcoupling element.

In accordance with processes used by pulsed lasers for pulse selection it is especially advantageous to include in the outcoupling element one steerable element that turns the direction of the polarization and that is grouped into the reflecting ray path and, as a second element included into the reflecting ray path, a polarization beam splitter, this element either allowing the pulse to pass through or reflecting the pulse off, depending on the polarization of the pulse.

Depending on the way of presetting the element that turns the direction of the polarization there is an opportunity to let the laser pulse pass through the dividing element without being reflected or to have the pulse reflected by the beam splitting element in order to get the pulse released out of the reflecting ray path.

An especially advantageous example of the application of the invention arranges the pulse compressing element in a way such that there will be an interaction between the laser pulse entering into the pulse compressing element and acoustic phonons during a time that is shorter than half the length of the pulse temporal duration. This is done in order to achieve a suboptimal shortening of the time duration of the pulse in order to utilize the multitude of possible shortenings of the temporal duration, thus providing for a larger bandwidth of different pulse lengths, out of which the preferred length of a pulse can be chosen by predefining the number of passes trough the reflecting ray path.

A multitude of known and suitable devices for stimulated Brillouin scattering can be used as the pulse compressing element. Providing for the pulse compressing element to include another element producing a converging beam array is especially advantageous. That element can be a lens or a wave guide, with which the the converging beam is generated, putting that converging beam into an active medium capable of stimulated Brillouin scattering.

It will be most advantageous if the active medium of the stimulated Brillouin scattering is a gas or a liquid.

When using a lens to generate a converging beamn, it should be provided for that the lens has a long focal length and that the converging path array is located, at least for the most part of it, inside the active medium.

The solution according to the principles of the invention has a special advantage, if the intensity of each laser pulse entering into the pulse compressing element has a larger maximum intensity than the preceding laser pulse.

Furthermore, it is advantageous as well, if the converging ray path has a length which is a multiple of the distance between the areas of the converging ray path, in which consecutive laser pulses generally reach the same intensity.

Advantageously the length of the pulse compressing cell of the pulse compressing element incorporating the active medium should be selected such that it equals a multiple of the distance that appears between the areas of the converging ray path, in which consecutive laser pulses generally reach the same intensity.

Such an arrangement of the pulse compressing cell is especially advantageous if in addition to the reduction of the duration of the laser pulse by stimulated Brillouin scattering a further pulse compression results from the creation of plasma inside the active medium of the pulse compressing cell.

Such creation of plasma creates an opportunity for additional reduction of the duration of a pulse, because the plasma being created inside the active medium absorbs all the remaining energy of the entering laser pulse in the event the intensity needed to create a plasma is exceeded.

An arrangement of the pulse compressing element as a long cell and an arrangement of the converging ray path with a long converging bundle of rays creates an opportunity that the plasmas created by consecutive laser pulses are not situated in the same location inside the active medium and that these plasmas have the same distance from one another as the areas, in which consecutive laser pulses generally reach the same intensity.

In order to achieve the best possible results from the multiple reduction of the duration and reflection of a laser pulse by the solution, according to the principles of the invention, it is additionally advantageously to dimension the reflecting ray path so that the phonons creating the reflected laser pulse fade away before the laser pulse, reflected in the reflection branch, re-enters the pulse compressing element. This solution has the big advantage that all interference during the creation of the phonons for the Brillouin scattering of the laser pulse newly entering into the pulse compressing element is avoided.

Inside the framework of the solution according to the principles of the invention, there are a large number solutions possible. One advantageous example of construction is arranged in such a way that the reflective branch contains a passive element to reflect the laser pulse back into the pulse compressing element, e.g. a mirror. Alternatively, it is provided that the reflecting branch incorporates an active element which reflects the laser pulse back to the pulse compressing element.

For example, an active reflecting element is an element reflecting the laser pulse though use of stimulated Brillouin scattering. This stimulated Brillouin scattering can also be done in a way, that only results in an unessential reduction of the duration of the laser pulse. Such an especially advantageous active reflecting element can be used for example as a second pulse compressing element, leading to a further reduction of the duration of the laser pulse.

One especially advantageous example of construction, is when the second pulse compressing element has the same characteristics as the first pulse compressing element; because of the fact that the reflection of the laser pulse is done in a phase conjugated way, all distortion of the laser pulse during its travel through the reflecting ray path are compensated for.

Up to now no further information was given about the characteristics of the reflecting branch. In order to give the reflected laser pulse a power capacity as large as possible, it is advantageous to include into the reflective branch an element amplifying the laser pulse.

This amplifying element can be constructed in several different ways.

An advantageous and especially simply constructed example may be realized by having the the reflecting branch include a laser oscillator, the laser active medium of the laser oscillator being used as the amplifying element of the reflecting branch.

In this very simple case the rear mirror of the laser oscillator is used as the passive reflecting element of the reflecting branch.

Realization of an alternative example of the solution, according to the principles of the invention, includes a laser amplifier situated after the laser oscillator, the laser amplifier being part of the reflecting branch.

In such a realization example it would in principal be possible that the reflecting branch includes the laser oscillator as well. It would be even more advantageous if the reflecting branch does not include the laser oscillator any more and if an optical isolator, situated between the laser oscillator and the laser amplifier is used as the reflecting element of the reflecting branch. This arrangement has the large advantage that the destruction of the laser oscillator is avoided and that losses occurring during the entry of the laser pulse into the laser oscillator by use of its outcoupling mirror do not occur.

Advantageously the optical isolator is made of a medium reflecting the laser pulse when an intensity threshold is crossed.

In the simplest case this medium is a medium that is active in regard to stimulated Brillouin scattering and that generally reflects back a laser pulse after the crossing of an intensity threshold for stimulated Brillouin scattering.

When a medium that is active in regard to stimulated Brillouin scattering is used, such an optical isolator can be constructed as a pulse compressing element as well, an element that not only reflects the laser pulse using stimulated Brillouin scattering, but that reduces the duration of the pulse, too. Therefore, there is a possibility, to use a second pulse compressing element as an optical isolator so that an additive pulse compression occurs.

In the case that the reflecting branch branches off the first ray path and includes a reflecting element, it is advantageously provided for that this reflecting branch includes a laser amplifier resulting in additional amplification of the laser pulse during its traveling forwards and backwards inside the reflecting branch.

It is especially advantageous if the laser oscillator is situated outside the reflecting ray path, such that the incoupling of the first laser pulse into the reflecting ray path has to be done by use of a polarizing beam splitter.

In that case it is especially advantageous if a steerable, polarizing turning element is situated inside the reflecting branch, the element keeping the laser pulse sufficiently polarized during the time the pulse is reflected back and forth.

Furthermore, the task of this invention can be solved by a method to create short pulses, in which a first laser pulse is created inside a laser oscillator, this first pulse being reflected back and shortened in its temporal duration in a pulse compressing element using stimulated Brillouin scattering, this pulse traveling along a first ray path from laser oscillator to the pulse compressing element, that path including the laser oscillator and the pulse compressing element. According to the principles of the invention, the laser pulse, after being shortened in its temporal duration and after being reflected back, leaves the pulse compressing element and enters by use of a reflecting element again into the pulse compressing element for further shortening of the temporal duration, the laser pulse being released out of the reflecting ray path by use of a outcoupling element.

It is especially advantageous if the laser pulse is released after a predetermined number of roundtrips through the reflecting ray path.

In order to achieve that goal, it is advantageous to monitor the number of roundtrips of the laser pulse through the reflecting ray path by a detector.

Further advantageous realizations of the method described above follow the advantageous characteristics of the solution according to the principles of the invention.

BRIEF DESCRIPTION OF THE DRAWINGS

Additional characteristics and advantages of the invention are an additional subject of the following description and of the following illustration of some realized examples.

On the drawing, the Figures show:

FIG. 1 a schematic representation of a device to create short pulses by use of stimulated Brillouin scattering known from prior art;

FIGS. 2a–d a schematic representation of the scientific mechanisms of stimulated Brillouin scattering;

DESCRIPTION OF PREFERRED EMBODIMENTS

Figure 3:
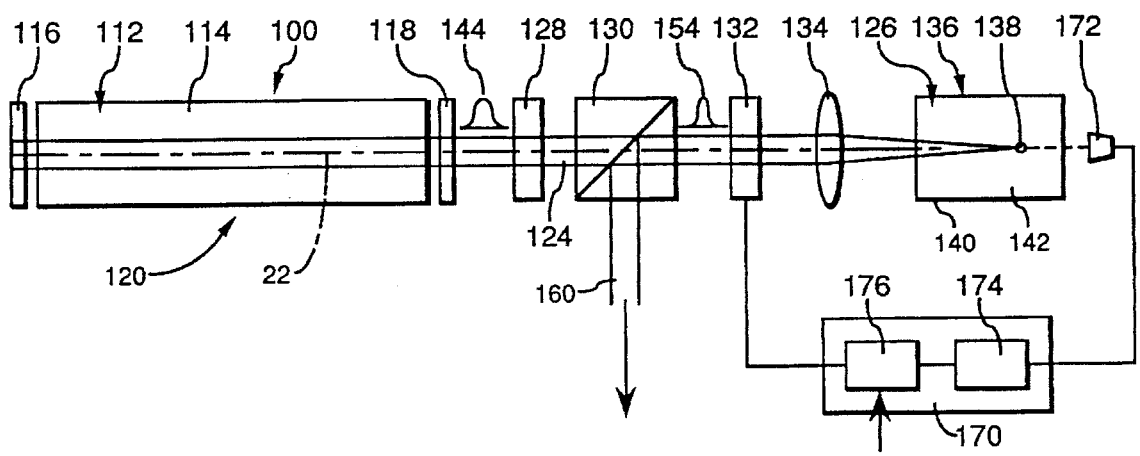
FIG. 3 a first example of realization of a device following the principles of this invention in a schematic representation similar to FIG. 1.

A device for the creation of short pulses, as known from prior art, depicted in FIG. 1 and marked as 10 as a whole, contains a laser oscillator 12 which a laser active medium 14, advantageously using Nd:YAG medium, being situated between two resonator mirrors 16 and 18 that make up a resonator 20.

In the resonator 20 laser radiation builds up along an optical axis 22. The radiation leaves resonator 20 and follows a first ray path, marked as 24 as a whole, to a pulse compressing element 26. Inside the first ray path 24 the resonator being followed by a polarizer 28, being followed by a polarizing beam splitter 30. This element is characterized in a way that the laser radiation, polarized by polarizer 28, is able to pass through the beam splitter 30. After that the radiation passes through a polarization turning element 32 and then enters into the pulse compressing element 26. This element uses a device 34, generating converging rays, e.g. a focusing lens, and a pulse compression cell 36, this cell including inside a focal area of the converging ray path which is due to element 34. The pulse compression cell 36 includes a box 40, inside of which an active medium is situated that is responsible for the generation of acoustic phonons and the stimulated Brillouin scattering caused by the phonons.

Advantageously, the laser oscillator 12 generates pulses with the time duration in the range of nanoseconds, e.g. pulses with a duration of 20 ns.

These first laser pulses 44 exit from the resonator 20, are polarized by polarizer 28 and pass through the polarizing beam splitter 30. They experience only a rotation of their polarization by the polarization turning element 32 in form of a small lambda/4-plate. The pulse then passes through the lens 34 and enters in direction 46 into the active medium 42, being focused on focal area 38 (FIG. 2a), this area being situated deeply inside the active medium 42. Inside the focal area 38, the generation of acoustic phonons leads to the generation of an ultra sonic grating after an intensity threshold is crossed, marked as 48 in FIG. 2b. This grating travels with speed of sound, the direction of its propagation 50 being parallel to the direction of entry 46. This ultra sonic grating represents a Bragg grating and it reflects with its front area 52, which is facing lens 34, the entering first laser pulse 44. The reflection happens in a phase conjugated way, such that a reflected phase conjugated laser pulse 54 travels in its reflected direction 56 opposite to the direction of its entry. Because of the fact, that the front area of the ultra sonic grating 48 is propagating at the speed of light in direction 56 inside the active medium 42, the reflected laser pulse 54 has a compressed temporal duration and, because it contains a substantial part of the energy of the first laser pulse 44, it has a higher intensity than the first laser pulse (FIG. 2c, FIG. 2d), such that the reflected pulse 54 leaves the compression cell 36, after being reduced in its temporal duration and with a higher intensity than the laser pulse 44. It passes through lens 34 again, receives a further rotation in the polarization turning element 32 in the amount of lambda/4, the turn twisted in the amount of 90° in comparison to the first laser pulse 44, such that the polarizing beam splitter 30 is able to reflect the temporal shortened pulse 54 into a second ray path 60. That leads to the possibility to outcouple the shortened pulse 54 or to further shorten the reduced pulse 54 in a second ray path 60.

The reflected laser pulse 54 has a down shifted frequency in comparison to the first pulse, because of the Doppler shift caused by the movement of the ultra sonic grating at the speed of sound. If gases are used as active medium 42, the frequency shift lies between 400 and 800 Mhz. If liquids are used as active medium 42, the shift amounts up to 3 Ghz at a wavelength of lambda=1.06 μm.

A first example of the realization of a device following the principles of this invention, depicted in FIG. 3, marked as 100 as a whole, a laser oscillator 112 is provided in a way similar to the way in the above given description of prior art, containing a laser active medium 114, situated in a resonator 120 between two resonator mirrors 116 and 118. The laser beam that propagates along the optical axis 122 uses first ray path 124 to get into the pulse compressing element 126.

The first ray path 124 again contains a polarizer 128 and a polarizing beam splitter 130. Instead of the passive polarization turning element 32 a Pockels cell 132 is situated between the polarizing beam splitter 130 and the pulse compressing element 126.

The pulse compressing element 126 also contains an element 134 to generate a converging ray path, this element being situated in a focal area 138 inside box 140 that contains an active medium 142 inside the pulse compression cell 136.

In the same way as prior art does, the laser oscillator 112 generates a first laser pulse 144, which—as described in connection with the description of prior art—gets reflected in the pulse compressing element 126 and exits from element 126 as a laser pulse 154, shortened in temporal duration and phase conjugated. The Pockels cell 132 is controlled in a way such that neither the polarization plane of the first laser pulse 144 nor the same plane of the reflected pulse 154 are changed, such that the reflected pulse 154 travels along ray path 124 through the polarizing beam splitter back to the laser oscillator 112, where it gets amplified in the laser active medium 114. From there it gets reflected back by resonator mirror 116 and travels—like the first laser pulse 44—back to the pulse compressing element 126. Here it is reflected again due to stimulated Brillouin scattering in the same way as described above, such that it travels as an additional reflected laser pulse 154 along the first ray path 124 back to the laser oscillator 112, gets amplified and enters the pulse compressing element 126 again to be further reflected and shortened in temporal duration. The first ray path 124 is identical with the reflecting ray path and at the same time is used as as the reflecting branch.

This means that the laser pulse 154 can travel back and forth between the pulse compressing element 126 with the laser oscillator 112, being transformed into a shortened pulse each cycle, until the theoretical limit of the shortening of the temporal duration of laser pulse 154 is reached, this limit being equal to the reciprocal numerical value of the acoustical frequency.

If the Pockels cell 132 is controlled in a way that it turns the polarization plane of the laser pulse exiting from the pulse compressing element 126 by an amount of 90°, the reflected laser pulse will then be reflected by the polarization beam splitter 130 into the second ray path 160.

According to this invention, the Pockels cell 132 is controlled in such a way that—after a pre determined number of reflections back and forth—the laser pulse 154, exiting out of the polarization beam splitter 130, gets reflected into the second ray path 160.

In order to get laser pulses of a determined temporal duration inside the second ray path 160, the first example of realization, according to FIG. 3, contains a steering device 170, connected with detector 172. This detector is situated on that side of the pulse compressing element 134 that lies opposite to the pulse compression cell 136 and detects each laser pulse 154 when entering into the pulse compressing cell 136 in entry direction 46 and when being reflected. The steering device uses a counter 174 to record the number of the laser pulses counted by detector 172 and compares the recorded value with the variably predeterminable maximum stored in a memory unit 176. If the maximum value stored in the memory unit 176 is reached, the steering device influences the Pockels cell 132 in a way that the polarization of laser pulse 154, just then exiting the pulse compressing element 126, is turned so that this pulse gets reflected by the polarizing beam splitter 130 into the second ray path 160.

This steering device gives the opportunity to receive laser pulses 154 inside the second ray path 160 with a shortened temporal duration that was variably predetermined.

Figure 4:
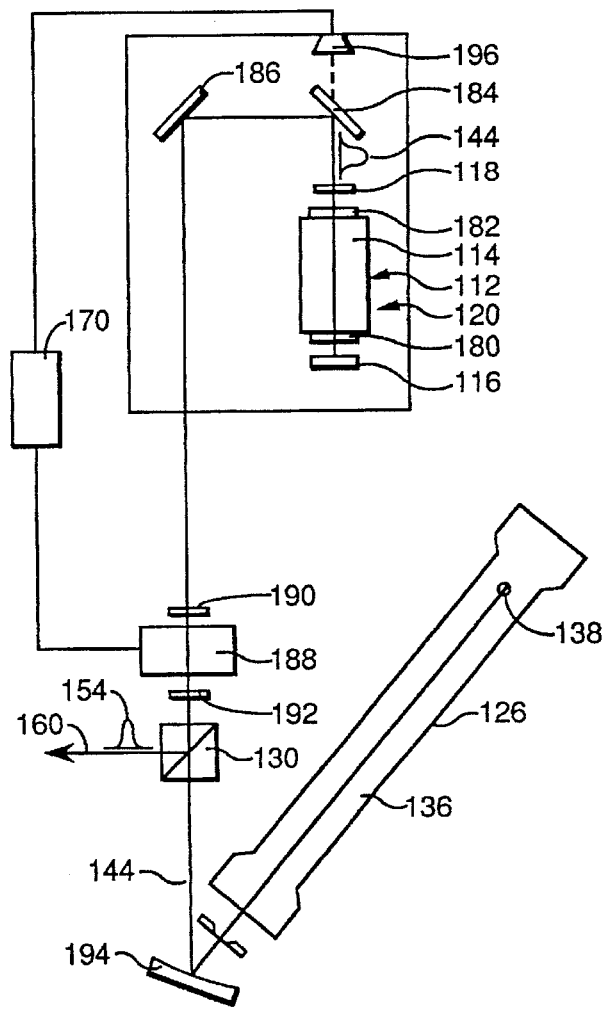
FIG. 4 a variant of the first example of realization.

In a modification of the first example of realization, (FIG. 3) depicted in FIG. 4, all those parts identical with the first example, are marked identically. In regard to that, all explanations given above are taken into reference.

In front of the resonator mirror 116 a q-switch is situated. Furthermore, there are the lambda/four plates 180 and 182 on both sides of the laser active medium that turn the polarization plane each in the amount of a fourth part of the wave length.

The laser pulse 144, exiting from the laser oscillator 112, is reflected by two high reflecting mirrors 184 and 186 and, before reaching the polarization beam splitter 130, travels through a Pockels cell 188. On both sides of the Pockels cell 188 there are small sheets 190 and 192 that convert the polarization by the use of a fourth part of the wave length plate.

After going through the polarization beam splitter, the laser pulse 144 hits a spherical mirror 194. This mirror has a long focal distance and focuses the laser pulse 144 into the focal area 138 inside the pulse compressing element 126. This variant of the first example of realization according to FIG. 4 principally operates in the same way as the first example itself, (FIG. 3) the only difference being, that a reflected laser pulse 154 gets outcoupled when it exits from the laser oscillator 112 and travels in the direction of the polarizing beam splitter 130.

To count the laser pulses 154, a detector 196 is used, which detects that part of the laser pulses 144 or 154 exiting from the laser oscillator 112, which is passing through the turning mirror 184. The detector is connected to steering device 170, which controls the Pockels cell 188.

Generally, this variant of the first realizable example operates principally identically to the first example.

The first realizable example according to FIG. 3, or its variant according to FIG. 4, can be run in a way that a pulse compression is achieved by stimulated Brillouin scattering, as described in detail in FIG. 2.

There is the possibility as well to work with higher intensities.

Figure 5:
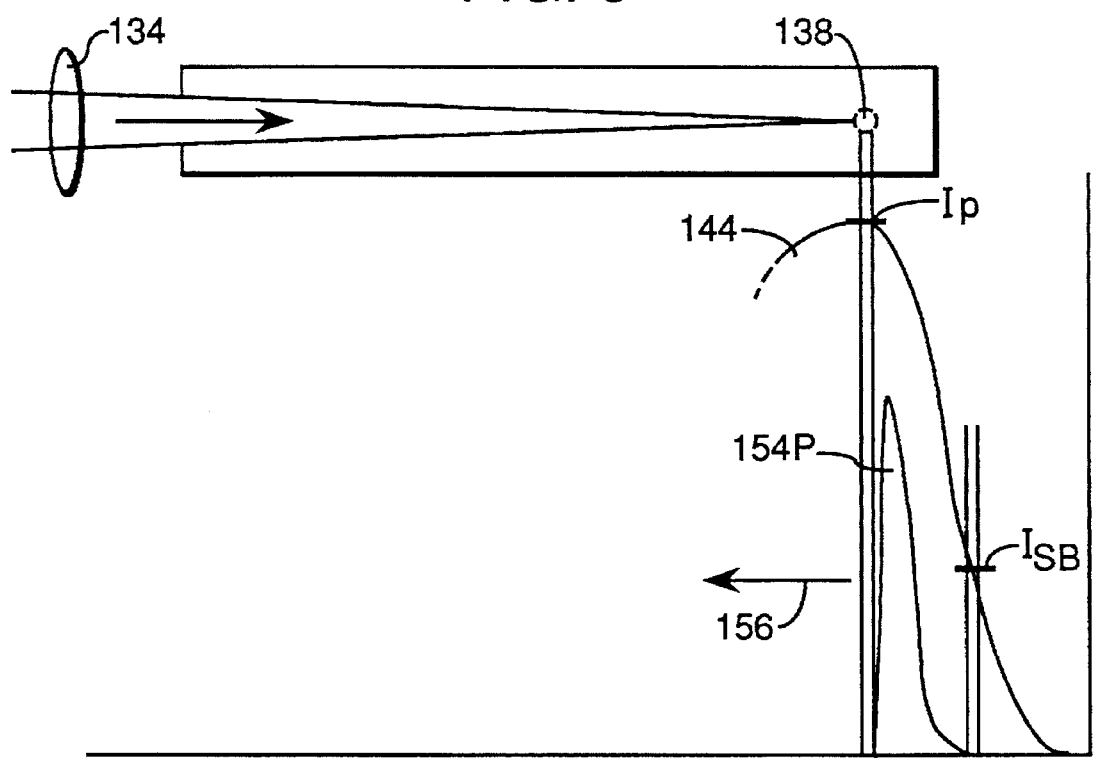
FIG. 5 a schematic representation of the scientific mechanisms of stimulated Brillouin scattering with additional creation of plasma.

In that case, as depicted in FIG. 5., the reflected laser pulse 154 is generated by stimulated Brillouin scattering as described above inside the focal area 138 after reaching a threshold intensity $I_{SB}$. The reflecting back of the energy in the form of the reflected laser pulse 154 will be interrupted, if the intensity of laser pulse 144 crosses threshold $I_p$. In that case, a plasma develops inside the focal area 138, this plasma absorbing all the energy of the entering first laser pulse 144. Thus an additional shortening of the reflected laser pulse 154 is achieved, this laser pulse being generated according to the mechanisms described in connection with FIG. 2.

Figure 6:
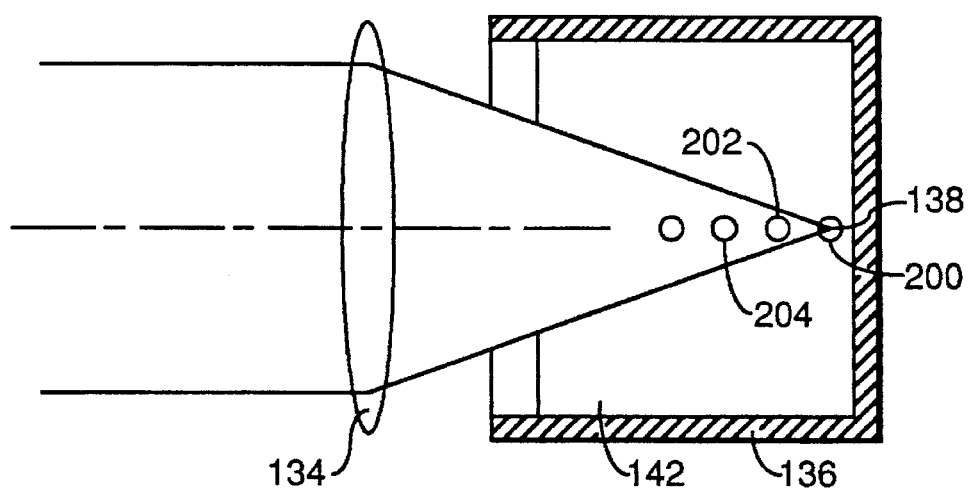
FIG. 6 a schematic representation of the local situation of plasmas during multiple back and forth reflection of laser pulses and of the mechanisms according to FIG. 5.

This shortened laser pulse 154 P, generated through the development of a plasma, propagates in the same way as laser pulse 154 in the reflecting direction 156. If the experimental arrangement is done according to FIG. 3 or FIG. 4, this laser pulse 154 P will be able to travel back to the laser oscillator 112, will be amplified by the laser oscillator 112 and will re-enter into the pulse compressing cell 136. In this case, however, the development of plasma, as described in FIG. 6., does not occur in the focal area 138, but the higher intensity of the re-entering laser pulse 154 P leads to the generation of a plasma in a lesser focused area of the converging ray bundle, so that the plasma 200, generated before, is no longer interfering. The plasma 202, being generated by the next entering laser pulse 154P, is shifted in the direction of element 134, which generates the converging ray bundle. Caused by the higher intensity, intensities $I_{SB}$ and $I_p$ are reached faster, such that the next laser pulse 154 P is shortened not only by the stimulated Brillouin scattering but additionally by the development of plasma 202.

In the same way this laser pulse 154 P is reflected back to the laser oscillator 112, is amplified there and re-enters into the pulse compression cell 136. In this process the generation of the next plasma 204 will be shifted again in the direction of element 134, which generates the converging ray bundle.

Therefore, the reflection of the next following laser pulse 154 P occurs in each instance in a different location than the reflection of the preceding laser pulse. Thus the decay time of the plasmas 200, 202 etc., has no influence on the back reflection of each following laser pulse, under the condition that the next following laser pulse does not enter the pulse compressing cell 136 before the acoustic phonons faded away that were involved in the stimulated Brillouin scattering of the preceding laser pulse 154. The time, during which the fading occurs, lies—depending on the active medium 142—in a proportion of some nano seconds up to a proportion of 10 or some 10 nano seconds, so that the length of the first ray path 124 is set accordingly.

Figure 7:
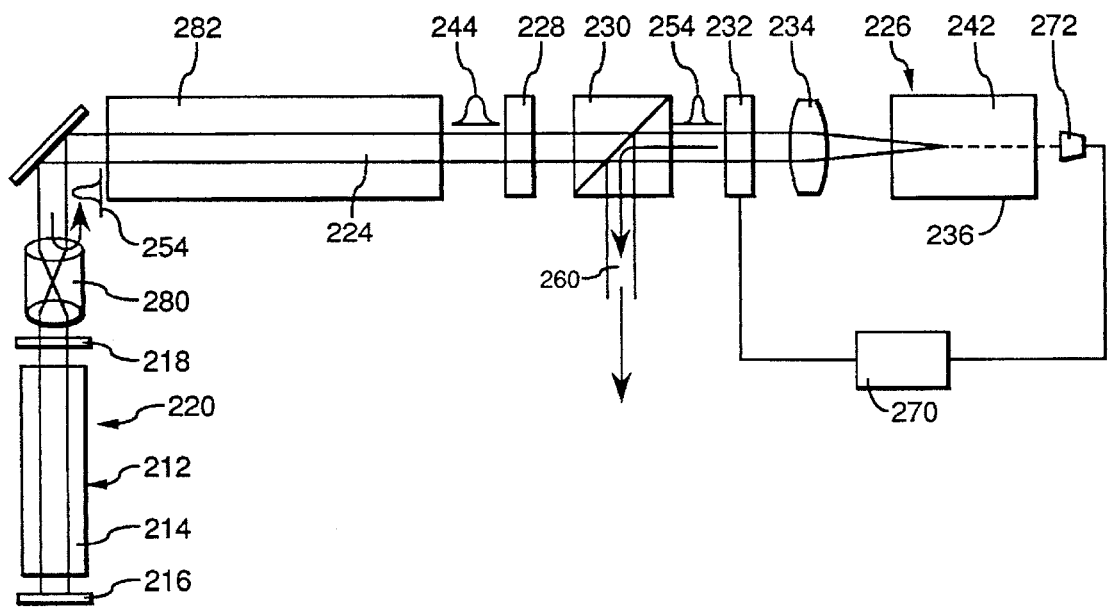
FIG. 7 a schematic representation of a second example of realization similar to FIG. 1 and FIG. 8 a schematic representation of a third realized example.

In a second example of realization, depicted in FIG. 7, the laser oscillator 212, with the laser active medium 214, this medium being enclosed by resonating mirrors 216 and 218 of the resonator 220, is followed by an optical isolator 280. This isolator separates an additional laser amplifier 282, which is situated in the ray path 224, of laser oscillator 212.

The laser amplifier is followed by a polarizer 228, after which a polarizing beam splitter 230 is situated. After the polarization beam splitter 230 the Pockels cell 232 is used as the polarizing turning element. In the same way, as in the first example, the pulse compressing element 226 is situated next, this element containing the pulse compressing cell 236 with the active medium 242 and with element 234, which generates a converging ray bundle, e.g. by means of a lens.

Again, in the second example, the laser pulse 244 is generated by the laser oscillator 212, is amplified in the laser amplifier 282, is shortened in its temporal duration inside the pulse compressing element 226 by use of stimulated Brillouin scattering and is reflected back as laser pulse 254, this laser pulse 254 re-entering the laser amplifier 282 and being amplified. After passing through the laser amplifier 282, the laser pulse 254 is reflected by the optic isolator 280, such that the pulse does not re-enter the laser oscillator 212.

The optical isolator 280 is arranged as a cell, for example, a cell, in which a medium is situated, which reflects rays by use of stimulated Brillouin scattering. The laser pulse 244, being generated by laser oscillator 212, has an intensity dimensioned in a way that this intensity is lower than the threshold for stimulated Brillouin scattering, such that the laser pulse 244 can pass through the optical isolator 280 uninhibited and unchanged. During that time the laser pulse 254, being reflected by the pulse compressing element 226, already has reached a higher intensity, which gets amplified even further by the laser amplifier 282, such that this intensity surpasses the threshold for stimulated Brillouin scattering inside the optical isolator 280. That being the case, the optical isolator 280 reflects the laser pulse 254 after passing through the amplifier 282 and reduces the temporal duration of that pulse additionally by a smaller or bigger amount. The back reflected laser pulse 254 passes again through the laser amplifier 282, gets amplified for a second time and enters again, on one hand shortened, on the other hand additionally amplified, the pulse compressing element 226, in which shortening of the temporal duration and reflection will occur again.

In the same way as in the first example, there is an identically functioning steering device 270, including a detector 272. The steering device controls the Pockels cell 232 after a specific number of laser pulses 254, thus causing a rotating of the polarization plane, such that this laser pulse gets reflected by the polarizing beam splitter 230 into the second ray path 260. Thus this second ray path delivers laser pulses with a predetermined shortened timely duration of the pulse.

Concerning the functioning of the steering device 270, the description of steering device 170 in connection with the first example is taken into reference.

In contrast to realization of the first example, the reflecting ray path is not identical with the first ray path 224. The reflecting ray path extends between the optical isolator 280 and the pulse compressing element 226 and the reflective branch includes the laser amplifier 282 and the optical isolator 280.

Figure 8:
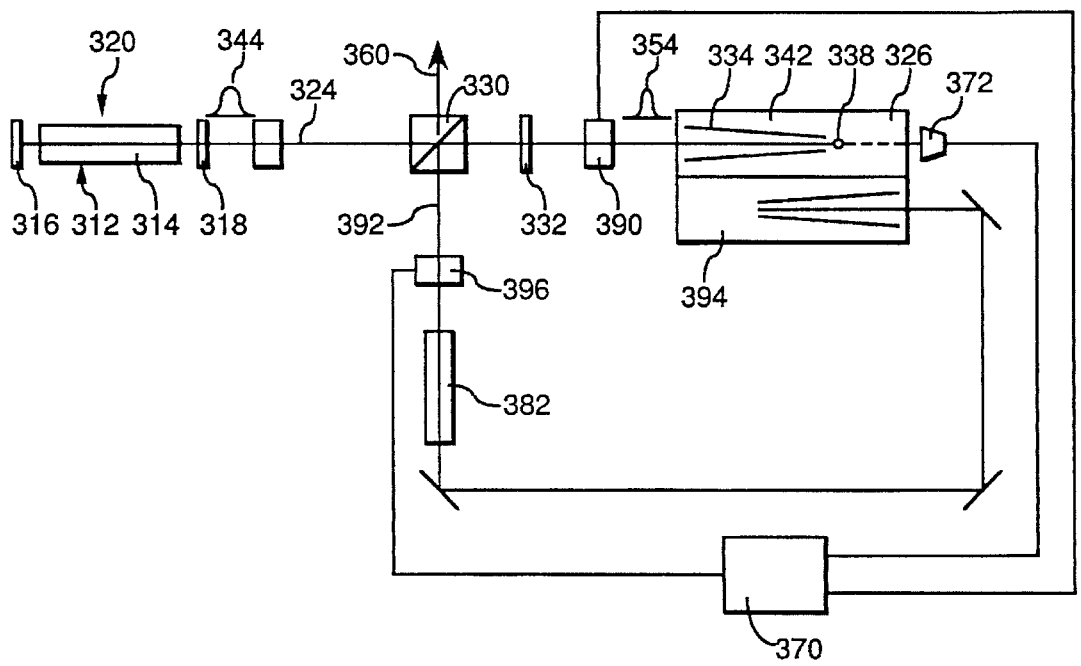

In a third example of realization, depicted in FIG. 8, a laser oscillator 312 is provided, which includes a resonator 320 with two resonator mirrors, 316 and 318, the laser active medium 314 being situated between these mirrors. Next to the laser oscillator 312 the first ray path 324 contains a polarizing beam splitter 330, being followed by a polarization turning element 332 and a Pockels cell 390. Following this cell there is the pulse compressing element 326, which uses in this case a waveguide 384 as an element to generate a converging ray bundle instead of a lens a wave guide that narrows conically along its length, this element collecting the radiation into a focal area 338. Inside the pulse compressing element 326 the same processes are going on, as described in connection with FIG. 2, causing the development of a reflected laser pulse 354, which is phase conjugated and shortened and exits in this form from the pulse compressing element 326, its polarization plane turned by the Pockels cell 390 by the amount of 90°, such that the pulse is reflected by the polarization beam splitter 330 into the reflecting branch 392, in which a laser amplifier 382 is situated and is enclosed by a second pulse compressing element 394, having the same characteristics and functioning as the pulse compressing element 326. The laser beam 354, on the one hand shortened in its temporal duration and phase conjugated on the other hand, is reflected and passes through the laser amplifier 382, gets reflected again by the polarization beam splitter 330 and re-enters again into the pulse compressing element 326.

The reflecting ray path extends between the pulse compressing element 392 and the pulse compressing element 326. The laser pulse 354 can travel back and forth inside this reflecting ray path, until the pulse is shortened sufficiently. To outcouple the laser pulse, the reflecting branch 392 contains an additional Pockels cell 396, which can—for example—be situated between the laser amplifier 382 and the polarizing beam splitter 330. The additional Pockels cell must be capable of turning the polarization plane by the amount of 90°, such that the laser pulse which is coming from the pulse compressing element 394 and is passing through the laser amplifier 382 is not reflected by the polarizing beam splitter 330 again into the pulse compressing element 326, but passes through this element into the second ray path 360. In order to always receive laser pulses with identical duration inside the second ray path 360, a steering device 370 is provided, which—together with the detector 372—detects the entry of a first laser pulse 344 into the pulse compressing element 326, activates the Pockels cell 390 accordingly and which counts furthermore the number of laser pulses which enter into the pulse compressing element 326 and which controls the Pockels cell 396 after a predetermined number of laser pulses 354 to outcouple the laser pulses from the reflecting ray path, as already described in detail in connection with the first example.

The advantage of the third example is that by using identically built pulse compressing elements 324 and 394 and the phase conjugate reflection of the laser pulses, a successive equalization of all distortions caused by the optical elements of the reflecting ray path is achieved.

All the examples of realization are advantageously characterized by the fact that the length of the pulse compressing cells are selected such that interaction between the entering laser pulse and the acoustic phonons during less than half of the timely duration of the pulse created in order to carry out the pulse compression in several steps which gives the biggest possible flexibility in terms of achievable pulse duration.

What is claimed is:

1. A device for generation of short laser pulses including a laser oscillator which produces a first laser pulse; a pulse compressing element, which retroreflects said first laser pulse by a stimulated Brillouin scattering as a temporally shortened laser pulse; a first ray path into which said laser oscillator and said pulse compressing element are arranged and along which said first laser pulse emitted by said laser oscillator, travels to said pulse compressing element; the improvement comprising, a) a reflecting branch into which said temporally shortened retroreflected laser pulse enters after having left said pulse compressing element, said reflecting branch retroreflecting said temporally shortened laser pulse again back to said pulse compressing element for further temporal reduction by using a reflecting element and b) an outcoupling element positioned in a reflecting ray path between said reflecting element and said pulse compressing element, which outcouples said shortened laser pulse from said reflecting ray path.

2. The device of claim 1 having a steering device which controls said outcoupling element in such a manner that after a predetermined number of reflections in said pulse compressing element, said outcoupling element couples said shortened laser pulse out of said reflecting ray path.

3. The device of claim 2, wherein said steering device is connected to a detector for monitoring the occurrence of a reflected laser pulse.

4. The device of claim 2 wherein said outcoupling element has a polarization rotating element and a polarizing beam splitter which are both positioned in said reflecting ray path.

5. The device of claim 1 wherein said pulse compressing element is built such that the time of interaction between the laser pulse entering into said pulse compressing element and the acoustic phonon lifetime, is shorter than half of the duration of said laser pulse.

6. The device of claim 5 wherein said reflection branch contains a passive reflection element for laser pulse reflection.

7. The device of claim 1 wherein each laser pulse following a preceding laser pulse entering into said pulse compressing element has a higher maximum intensity than said preceding laser pulse.

8. The device of claim 7 wherein said pulse compressing element includes an element which produces a converging ray path and means for selecting the length of successive converging ray paths such that subsequent laser pulses are essentially of the same intensity.

9. The device of claim 7 wherein said pulse compressing element includes a pulse compression cell with an active medium and means for selecting the length of the converging ray path as defined by a series of focal points wherein subsequent laser pulses reach substantially the same intensity.

10. The device of claim 9 wherein said pulse compressing element, in addition to providing a temporal shortening of a laser pulse due to stimulated Brillouin scattering, also provides a pulse shortening due to plasma generation in the active medium of said pulse compression cell.

11. The device of claim 1 wherein said reflecting ray path is dimensioned such that the acoustic phonons generating a reflected laser pulse in said pulse compressing element, have decayed until the laser pulse reflected in said reflection branch reenters said pulse compressing element.

12. The device of claim 1 wherein said reflection branch contains an active reflection element which retroreflects a laser pulse to said pulse compressing element.

13. The device of claim 12 wherein said active reflection element operates due to stimulated Brillouin scattering.

14. The device of claim 12 wherein said active reflection element is a second pulse compressing element which produces an additional temporal shortening of said laser pulse.

15. The device of claim 14 wherein said second pulse compression element is similar to said first pulse compressing element.

16. The device of claim 14 wherein said reflecting branch contains an amplifying element for laser pulse amplification.

17. The device of claim 16 wherein said reflection branch contains a laser oscillator and the laser active medium of said laser oscillator acts as the amplifying element in said reflection branch.

18. The device of claim 16 having a laser amplifier which is situated in series with said laser oscillator and wherein said laser amplifier belongs to said reflection branch.

19. The device of claim 18 wherein said reflection branch contains an optical isolator acting as a reflection agent between a laser oscillator and a laser amplifier.

20. The device of claim 19 wherein said optical isolator has a medium which retroreflects a laser pulse as soon as a threshold of intensity is exceeded.

21. The device of claim 20 wherein said optical isolator contains a stimulated Brillouin active medium which essentially retroreflects said laser pulse as soon as an intensity threshold of stimulated Brillouin scattering is exceeded.

22. The device of claim 20 wherein said optical isolator acts as a pulse compressing element.

23. The device of claim 18 wherein said reflection branch veers off from said first ray path.

24. The device of claim 23 wherein said reflection branch contains a laser amplifier.

25. The device of claim 24 wherein said reflection branch contains a pulse compressing element which serves as a reflecting element.

26. A method for generating short laser pulses during which a first laser pulse is generated in a laser oscillator, which first laser pulse is temporally shortened and retroreflected in a pulse compressing element by means of stimulated Brillouin scattering and is traveling in a first ray path in which said laser oscillator and said pulse compressing element are arranged, from said laser oscillator to said pulse compressing element, the improvement comprising a) directing said temporally shortened retroreflected laser pulse into a reflection branch after having left said pulse compressing element, b) reflecting said shortened pulse again into said pulse compressing element for further temporal shortening using a reflection element and c) coupling said shortened pulse out of a reflection ray path between said reflection element and said pulse compressing element by means of an outcoupling element.

27. The method of claim 26 wherein said laser pulse is coupled out of said reflecting ray path after a desired number of round trips.

28. The method of claim 27 wherein the number of round trips of said laser pulse through said reflection ray path are monitored and activating said outcoupling element after a desired number of said round trips to outcouple said laser pulse.

29. The method of claim 27 wherein said pulse is progressively shortened during said round trips to a desired pulse duration and then coupled out of said reflecting ray path.

* * * * *